UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

QUINOLIN COMPOUNDS AND PROCESS OF PRODUCING SAME.

1,098,022.     Specification of Letters Patent.     Patented May 26, 1914.

No Drawing.     Application filed January 31, 1913. Serial No. 745,376.

*To all whom it may concern:*

Be it known that I, ALEX B. DAVIS, a citizen of the United States, residing at Indianapolis, Marion county, and State of Indiana, have invented and discovered certain new and useful Improvements in Quinolin Compounds and Processes of Producing Same, of which the following is a specification.

My invention relates to compounds of the quinolin series and processes of producing them.

The compounds are all derivatives of (2) ortho-oxy-phenyl-quinolin (4) carboxylic acid, which are made by the process of boiling together in molecular proportions in absolute alcoholic solution, an aromatic aldehyde, an aromatic amin and pyruvic acid.

The following hitherto unknown compounds have been prepared by my method: (2) ortho-oxy-phenyl (6) methyl-quinolin (4)-carboxylic acid, (2) ortho-oxy-phenyl (8)-methyl-quinolin (4) carboxylic acid, (2 ortho-oxy-phenyl (7) methyl-quinolin (4) carboxylic acid, (2) ortho-oxy-phenyl (6) methoxy-quinolin (4) carboxylic acid, (2) ortho-oxy-phenyl (7) methoxy-quinolin (4) carboxylic acid, (2)-ortho-oxy-phenyl (8) methoxy-quinolin (4)-carboxylic acid.

This new quinolin compound may be represented by the following formula:

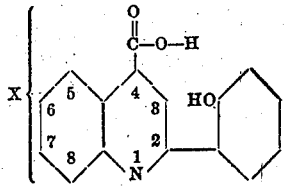

in which X is a radical taking the place of the hydrogen atom in one of the CH groups of the quinolin ring.

Esters of these acids may be obtained by known processes of esterification. For instance, the ethyl esters may be obtained by passing dry hydrochloric acid gas into solutions of the acids in absolute alcohol.

While all of the above compounds are of value, I wish especially to cover the first of the above list, namely (2) ortho-oxy-phenyl-(6) methyl-quinolin (4) carboxylic acid, which can be obtained by boiling together in absolute alcoholic solution, equimolecular proportions of para-toluidin, salicyclic aldehyde and pyroracemic (pyruvic) acid for a number of hours, and allowing to crystallize.

In carrying out the process in detail, one may proceed as follows: In a vessel provided with a reflux condenser, are placed 61 parts (by weight) of salicyclic aldehyde, and 44 parts of pyruvic acid, and to this mixture there is added an equal volume of absolute alcohol. It is then heated to boiling and in the course of ½ hr. 53.5 parts of para-toluidin in solution in an equal volume of absolute alcohol are allowed to flow in. The resulting mixture is boiled four hours, and then set aside, when the quinolin compound crystallizes out, is filtered off and recrystallized twice from 90% methyl alcohol. It then appears as yellow crystals melting at 95° C. The other members of the group are produced in much the same manner from the corresponding toluidins or anisidins.

What I claim is,

1. A quinolin compound having the following formula:—

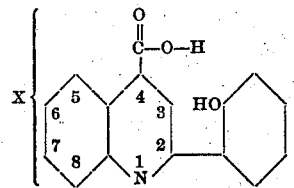

in which X is a radical taking the place of the hydrogen atom in one of the CH groups of the quinolin ring.

2. A quinolin compound consisting of (2) ortho-oxy-phenyl-methyl-quinolin (4)-carboxylic acid.

3. A quinolin compound consisting of (2) ortho-oxy-phenyl (6) methyl-quinolin-(4) carboxylic acid.

4. The process of producing a quinolin compound which consists in boiling together in absolute alcoholic solution equimolecular proportions of para-toluidin, salicyclic aldehyde and pyruvic acid and then permitting the compound to crystallize.

5. The process of producing derivatives of (2) ortho-oxy-phenyl-quinolin (4) carboxylic acid which consists in boiling together in absolute alcoholic solution equimolecular proportions of salicyclic aldehyde, pyruvic acid and an equimolecular proportion of an aromatic amin suitable for forming a member of the group desired to be produced.

6. The process of producing a quinolin compound which consists in boiling together salicyclic aldehyde, para-toluidin and pyruvic acid in equimolecular proportions in absolute alcoholic solution, permitting the resulting quinolin compound to crystallize out and then recrystallizing the product from alcohol.

In witness whereof, I have hereunto set my hand and seal at Indianapolis, Indiana, this twenty eighth day of January, A. D. nineteen hundred and thirteen.

ALEX B. DAVIS. [L. S.]

Witnesses:
FRANK R. ELDRED,
W. SHOWALTER.